United States Patent [19]

Adams, Jr. et al.

[11] Patent Number: 5,442,708
[45] Date of Patent: Aug. 15, 1995

[54] COMPUTER NETWORK ENCRYPTION/DECRYPTION DEVICE

[75] Inventors: Richard L. Adams, Jr., Fairfax, Va.; Peter D. Hallenbeck, Elfland, N.C.

[73] Assignee: UUNET Technologies, Inc., Falls Churck, Va.

[21] Appl. No.: 305,509

[22] Filed: Sep. 13, 1994

Related U.S. Application Data

[63] Continuation of Ser. No. 28,437, Mar. 9, 1993, abandoned.

[51] Int. Cl.6 ............................................. H04L 9/00
[52] U.S. Cl. ......................................... 380/49; 380/9; 380/50
[58] Field of Search ..................... 380/4, 9, 10, 28, 29, 380/30, 49, 50

[56] References Cited

U.S. PATENT DOCUMENTS

| | | | |
|---|---|---|---|
| 4,159,468 | 6/1979 | Barnes et al. | 371/53 |
| 4,160,120 | 7/1979 | Barnes et al. | 380/29 |
| 4,829,560 | 5/1989 | Seth-Smith et al. | 380/10 |

*Primary Examiner*—Bernarr E. Gregory
*Attorney, Agent, or Firm*—Heller, Ehrman, White & McAuliffe

[57] ABSTRACT

A computer network encryption/decryption device includes at least one microprocessor, microprocessor support hardware, at least two network ports for connecting to upstream and downstream networks, memory hardware for storing program, configuration, and keylist data, and data encryption/decryption hardware. Both network ports have the same network address, making the device transparent to the local area network in which it is spliced. The device operates by selectively encrypting or decrypting only the data portion of a data packet, leaving the routing information contained in the header and trailer portions of the data packet unchanged.

18 Claims, 10 Drawing Sheets

COMPUTER NETWORK ENCRYPTION/DECRYPTION DEVICE

This is a continuation of application Ser. No. 08/028,437 filed Mar. 9, 1993 now abandoned.

BACKGROUND OF THE INVENTION

The present invention relates to computer network communication systems, and more particularly to computer network communication systems wherein the data transmitted between terminals is encrypted.

Computer networks provide a user friendly way by which computer operators can receive data from, or transmit data to remote locations. The process by which a user will interact with a remote location hides the user from the operation of other processes, each of which will accomplish some activity necessary for the transmission of the data. Each of these processes is referred to as a "layer." There are seven layers in the commonly used Open Systems Interconnection (OSI) Reference Model, each of which is listed below:

1. Physical transmission of data to the network (physical layer).
2. Error-free transmission of packets over individual data links (data link layer).
3. Subdivision of files into packets, logging packets over available links, and ordering of received packets (network layer).
4. Mapping of the agreed-on service on the transmission facilities available (transport layer).
5. File and destination identification (session layer).
6. Data translation (presentation layer).
7. User Interface (application layer).

The rules implemented at each of the transmission or segment of transmission for accomplishment of any one of these or similar activities is called a protocol. Each protocol is expressed in such a way as to hide all lower-layer activities.

Each layer N (where the value of N ranges from 1 to 7 in the OSI Reference Model) provides services to its user, layer N+1. To accomplish this, layer N uses the functions made available to it by layer N−1. For example, network layer 3 provides service to transport layer 4, using functions provided to it by data link layer 2.

The internal structure of these layers above or below layer N are not know by layer N. Each layer includes a process at each end of the transmission and implements the activities necessary to offer and enhance the service to the layer above. The protocol for layer N is a set of rules implemented by the processes at that layer. Control information and data are exchanged across the interface between layers N and N+1. This can be either control for layer N at either end of the transmission or data destined for layer N+1 at the other end. The process, therefore, has two interfaces, one at each layer above and below and one with the corresponding process at the other end of the transmission.

Whatever information is placed in the message by one layer of protocol is treated as data by, and is transparent to, lower layers of protocol. At the transmitting end, layer N−1 adds header and trailer characters to the message that will provide control information as needed by the layer N−1 receiving process to implement layer N−1 protocol. Similar header and trailer characters may have been added to the message by layer N. To layer N−1 these header and trailer characters are treated just as if they were part of the original message. If there exists a layer N−2, still another header and trailer may be added to the message as it is passed down to this layer at the transmitting end.

There is no single set of protocols used in all networks. Some may use more than the seven layers described here, some fewer.

There are currently many networks in use on various pieces of hardware and with various operating systems. These networks may have differing data transfer rates, size of transmitted data fragment (or packet) and other differences which cause compatibility problems. Fortunately, a few standards have evolved which allow these divergent systems to communicate. The development of the Internet Protocol (IP), which usually operates at the network layer, is one of these.

With the advent of the IP, computer systems throughout the world can now communicate with each other. Because of the great distances separating these machines, the physical wiring and interconnections that make up a network's physical layer are not under any given organization's control. In fact, leased lines from telephone companies carry much of the traffic of these networks. This presents security problems because there are many points on any given network that can be tapped, essentially allowing the person tapping into the network to "listen in" to the data transmitted over the lines.

A solution to these problems would be to encrypt each data packet sent over the non-secured lines, preventing unauthorized persons tapped into the signal from understanding the transmission. However, this approach cannot work in open systems like those using the Internet Protocol because routing functions are performed by switches or gateways which are physically distributed along the network. These gateways force all routing information (present in the header and trailer portions of the data packet) to be in clear, machine-readable Internet Protocol form. They therefore prohibit the encryption of an entire packet before transmission into a communications channel.

Because of the requirement that the header and trailer information remain intact, prior attempts to provide secure communications between distant computer systems have focused on encrypting data before it is sent over the network.

For example, users can manually encrypt data, or use a utility program to encrypt data before it is broken up into packets and sent over the network. However, there are two problems with this approach. First, users are required to perform a separate step before each transmission of data, breaking the seamless integration of the network and the operating system. Because of this separate step, users can become lazy or forget to encrypt data before it is sent. Second, this approach is impractical in situations other than simple file transfer where there is repeated interaction between computer systems connected to a network. Manual encryption in these situations is not a viable option because it would slow these network services immensely.

Another method of providing secure communications is to have the operating system encrypt and decrypt all data coming in and out. While this solves the problem of forgetful or lazy users, it creates another one: the system can only communicate with like systems. Different systems or networks cannot communicate. In addition, an operating system upgrade is required to secure the communications.

Yet another approach to providing security is to physically confine the network to prevent unauthorized access. However, typically only the military has the resources to own and confine a physically large network, and in so doing they eliminate the advantages of tying into the outside world.

On a smaller scale, some systems attempt to encrypt all packets and thus define a sub-network. However, the end result will typically have one of two flaws: either the users are deprived of a robustness and utility of the network and thus are constrained as if they were not connected to the network at all, or security is compromised if access to the entire network is allowed. In general, all of these solutions to the problem of providing secure communications eliminate much of the functionality which make networks useful in the first place.

Accordingly, it is an object of the present invention to provide transparent, secure communications between computer systems or LANs connected to an open network, while allowing full access to other computer systems or LANs connected to the open network.

Additional objects, advantages and novel features of the present invention will be set forth in part in the description which follows and in part become apparent to those skilled in the art upon examination of the following, or may be learned by practice of the invention. The objects and advantages of the invention may be realized and attained by means of the instrumentalities and combinations which are pointed out in the appended claims.

SUMMARY OF THE INVENTION

The present invention is directed to a device for encrypting and decrypting data transmitted between computer systems or local area networks (LANs) connected to an open computer network. In one preferred embodiment, the device includes a high performance microprocessor for examining routing information and directing data packets that flow through the device, memory for storing routing information, encryption and decryption hardware for encrypting and decrypting data, support peripherals to support the operation of the microprocessor and integrate the device into the network, and two network interface ports for interfacing with the existing network. Both of the network interface ports have the same port address.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Reference will now be made in detail to a preferred embodiment of the invention, an example of which is illustrated in the accompanying drawings. While the invention will be described in conjunction with that preferred embodiment, it will be understood that it is not intended to limit the invention to one preferred embodiment. On the contrary, it is intended to cover alternatives, modifications and equivalents as may be included within the spirit and scope of the invention as defined by the appended claims.

Since all networks use a layered approach, the most common of which is a variant of the OSI Reference Model, the correct layer must be used to implement the security. Going too far "down" in the layers removes the routing information needed for the distributed routing approach many networks use. In the Internet systems, the layer at which IP packets are sent is the best layer to insert this invention, because this layer is transparent to and independent of both the users and application programs, and the underlying hardware.

The present invention is spliced into the lines of a local area network so that it may intercept all the information flowing into or out of the LAN at the correct layer and encrypt or decrypt only the data portion of the network's packets, the act of encrypting or decrypting being dependent upon the contents of the header portion of the data packet.

Because the device is spliced into the lines of a LAN, it can be added without any changes to the existing LAN. Most sites have a single link to the outside or non-local part of the network. Inserting the security invention at this point makes the sub-network below the box secure. In addition, because both network ports have the same address, the device is transparent to the existing LAN.

A table is maintained inside the device. This table includes a list of site, destination, port, or other information that may be present in a header to make a routing or encryption/decryption decision. The table also includes handling instructions, to determine whether to encrypt, decrypt, pass through, or discard ("toss") data passing through the device. Also included in the table are keys for encrypting and decrypting data. There is a mechanism which allows the administrator of a sub-network to maintain a list of sites and encryption keys associated with those sites. The encryption keys can also be public encryption keys, such as those patented by RSA Data Security of Redwood City, Calif., or can be a secret Data Encryption Standard (DES) key.

This device allows any number of sub-networks to communicate between themselves in a secure fashion over a public network, yet allows full access to all other sites on the network. Installation of the device requires no changes to the underlying system. Per site key tables allow control and generation of a hierarchy of security which is controlled by the site administrators.

Figure 1:
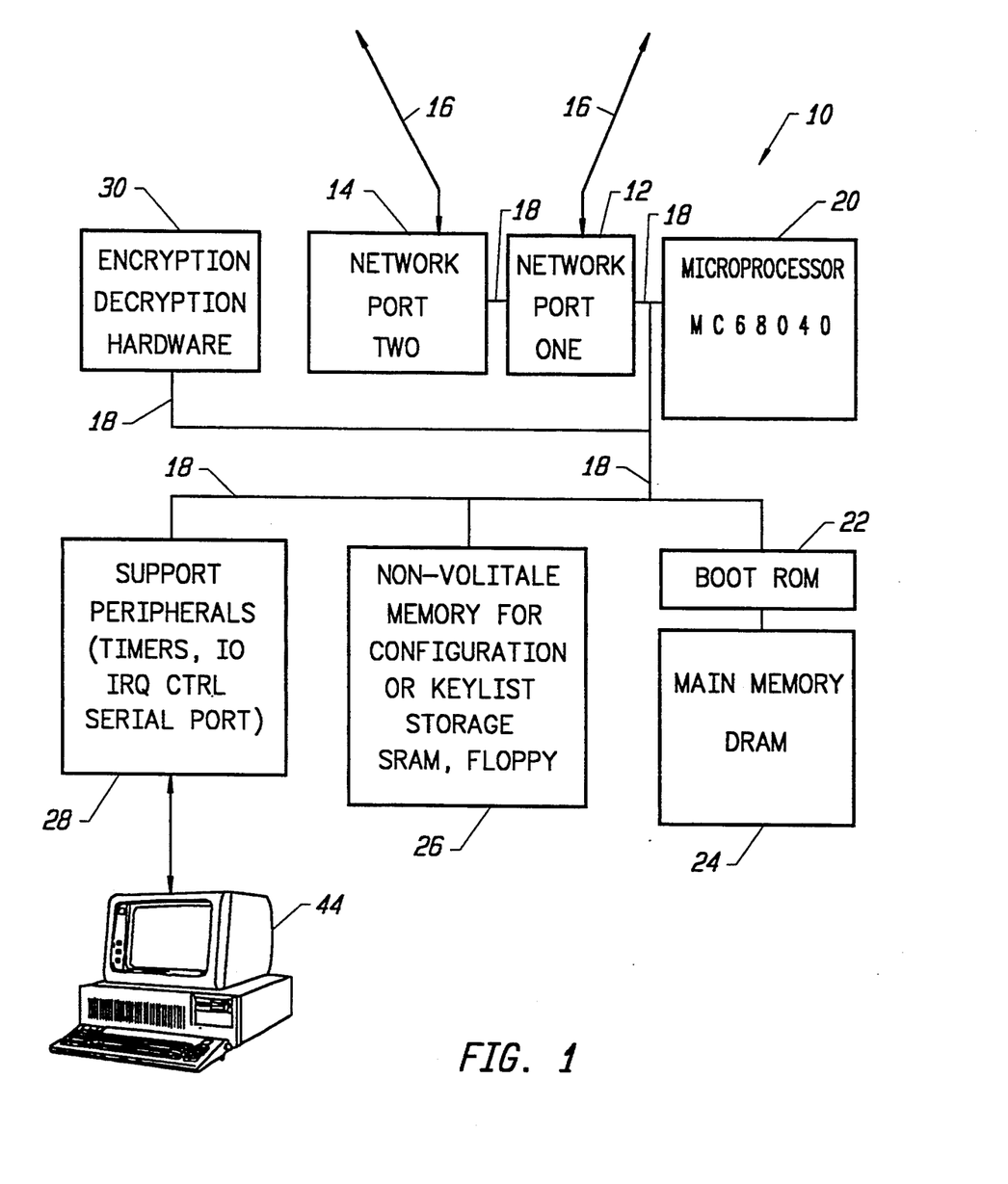
FIG. 1 is a block diagram showing the interconnection of major components according to the present invention.

Referring now to the drawings wherein like components are designated by like reference units, FIG. 1 illustrates a preferred embodiment of a Computer Network Encryption/Decryption Device (CNEDD) according to the present invention. The CNEDD is designated by general reference numeral 10.

CNEDD 10 has a first network port 12 and a second network port 14 spliced into existing network transmission medium 16. First network port 12 and second network port 14 both have the same network address. For reasons to be described below, first network port 12 will be referred to as the "upstream" port, and second network port 14 will be referred to as the "downstream" port. As will be shown below, upstream port 12 and downstream port 14 can be connected to different types of network transmission media, depending on the placement of CNEDD 10 into the existing networks. Electrically connected to network ports 12 and 14 via data bus 18 is a high speed microprocessor 20, such as the Motorola MC 68040.

Microprocessor 20 is also electrically connected, via data bus 18, to boot Read Only Memory (ROM) 22 for initializing microprocessor 20, main memory 24 for the use of microprocessor 20, non-volatile memory for the storage of keylist and configuration data 26, support peripherals 28 for supporting the operation of microprocessor 20 and for connecting CNEDD to control terminal 44, control terminal 44 for controlling or changing the keylist, and encryption/decryption hardware 30 for encrypting and decrypting data.

Figure 2:
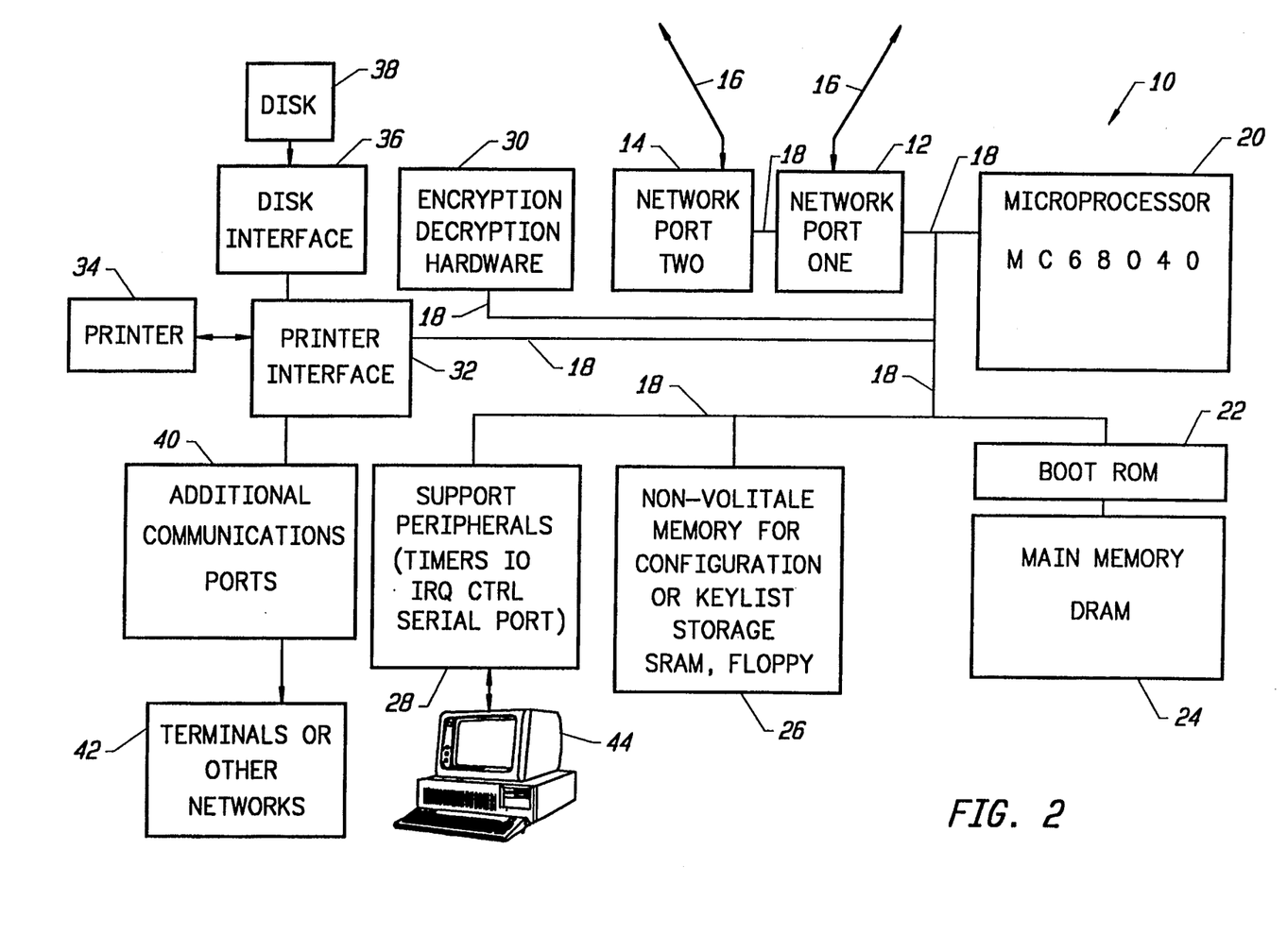
FIG. 2 is a block diagram of the invention showing additional features including a disk interface, a printer interface, and additional communications ports.

Referring now to FIG. 2, an alternative embodiment of CNEDD 10, Microprocessor 20 is also electrically connected, via data bus 18, to printer interface 32 for connecting to external printer 34, disk interface 36 for connecting to external disk drive 38, and additional communications ports 40 for connecting to external terminals or other networks 42.

Figure 3:
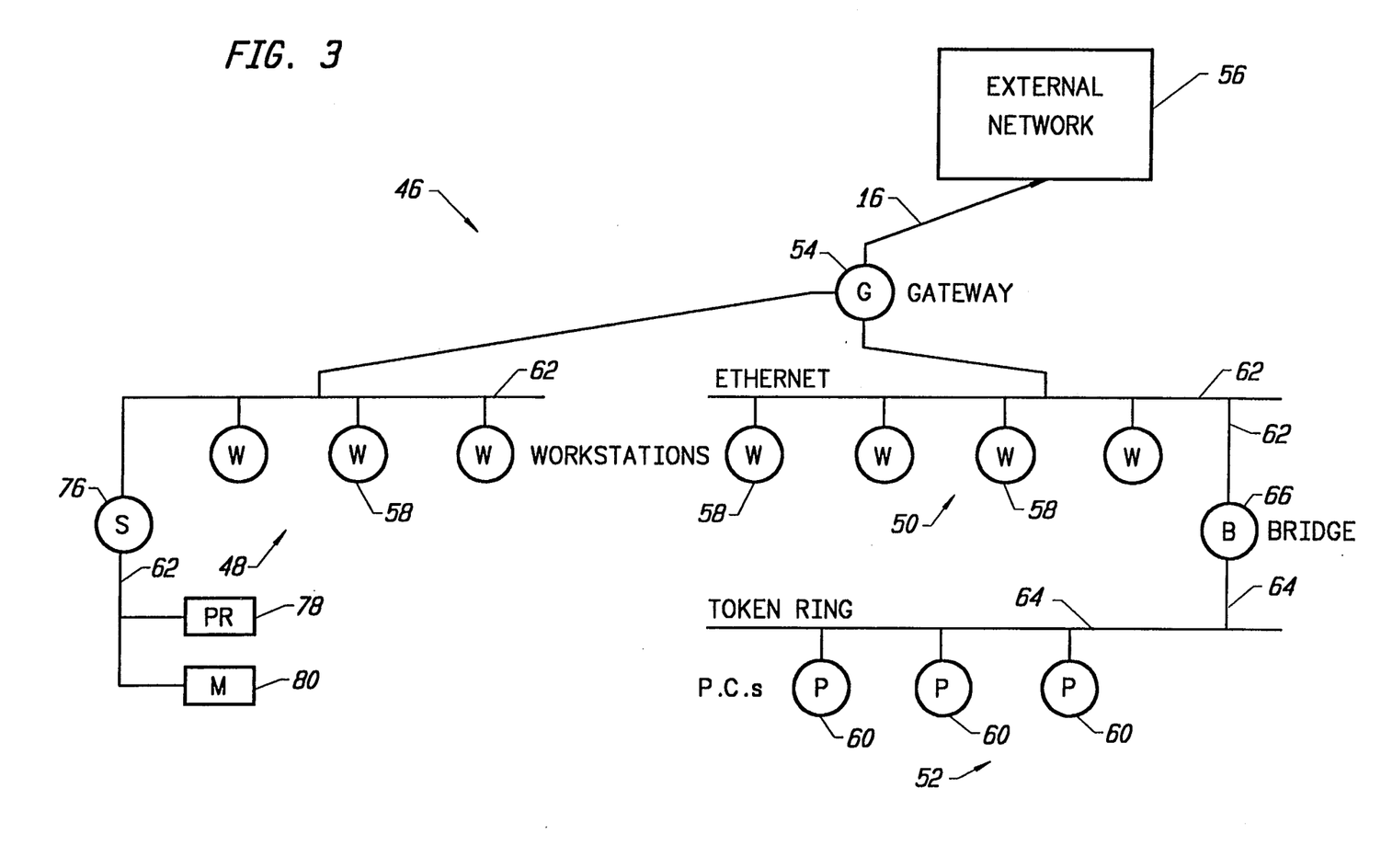
FIG. 3 is a block diagram showing a typical arrangement and interconnection of computers in a plurality of computer networks.

Referring now to FIG. 3, a typical arrangement and interconnection of computers in a computer network 46 is shown. Sub-networks 48, 50, and 52 connect to gateway 54. Gateway 54 is, in turn, connected via network transmission medium 16 to external network 56.

Sub-networks 48 and 50 might be Ethernet networks connecting together workstations 58 via Ethernet transmission medium 62. Sub-network 52 might be a token ring network connecting together personal computers 60 via token ring transmission medium 64.

Token ring sub-network 52 might be connected to Ethernet sub-network 48 or 50 via network bridge 66. Also shown in sub-network 48 is sub-network service computer 76. Service computer 76 might perform such functions as file serving, printer spooling, remote system backup, and modem serving. Attached to service computer 76 via Ethernet transmission medium 62 are printer 78 and modem 80 for the use of sub-network 48. The connection to external network 56 via gateway 54 is typically a serial network protocol such as High-Level Data Link Control (HDLC) running at 64 thousand to 2 million bits per second.

Figure 4A:
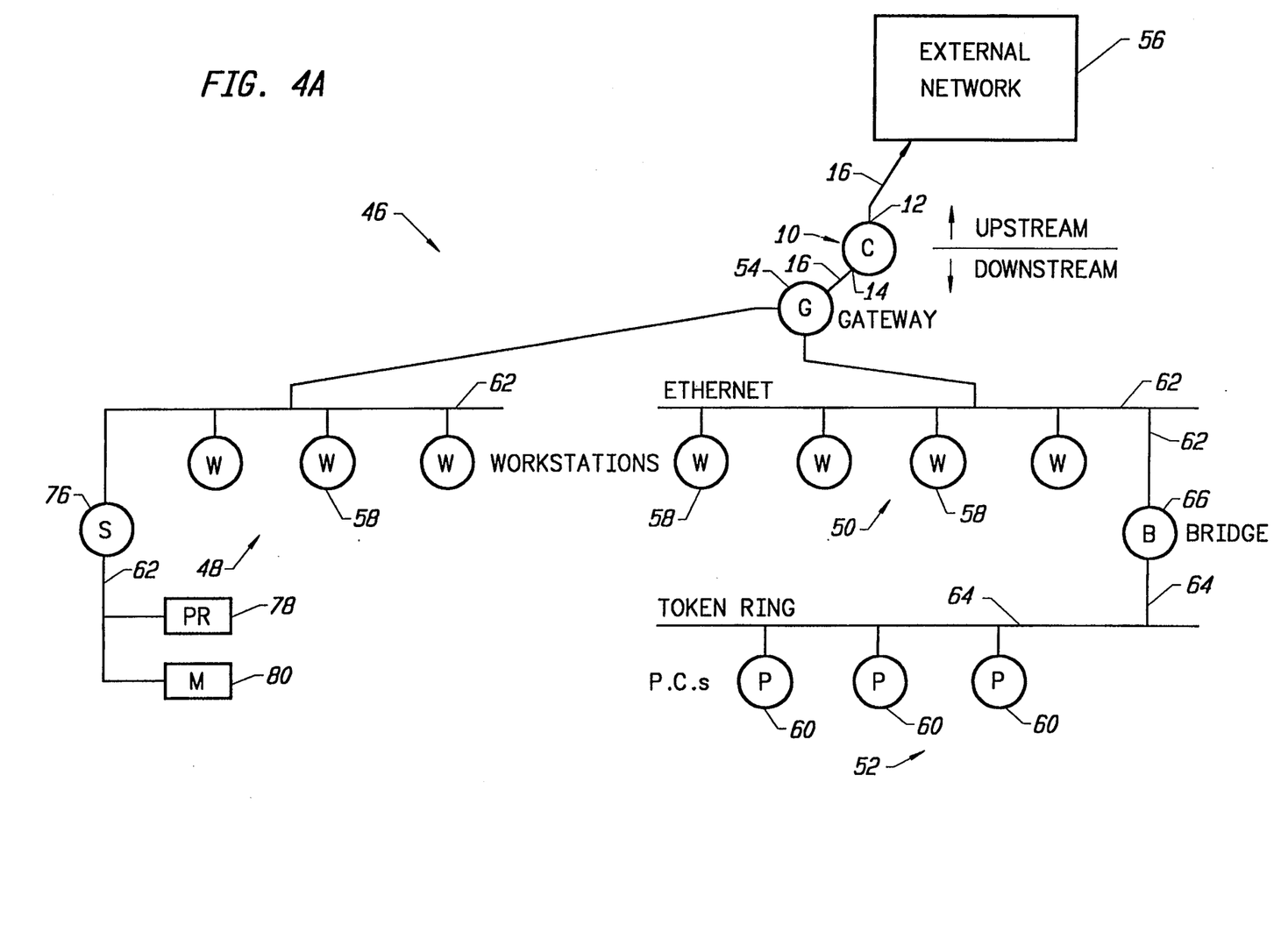
FIG. 4A is a block diagram showing a placement of the present invention in the networks of FIG. 3.

FIG. 4A shows the sub-networks of FIG. 3 with the addition of CNEDD 10 spliced into the serial data stream between gateway 54 and external network 56. As is shown in FIG. 4A, data flowing to or coming from external network 56 is referred to as "upstream" data. Similarly, data flowing to or coming from sub-network 46 is referred to as "downstream" data. Accordingly, upstream network port 12 is connected to network transmission medium 16 leading to external network 56, and downstream network port 14 is connected to network transmission medium 16 leading to gateway 54.

Figure 8:
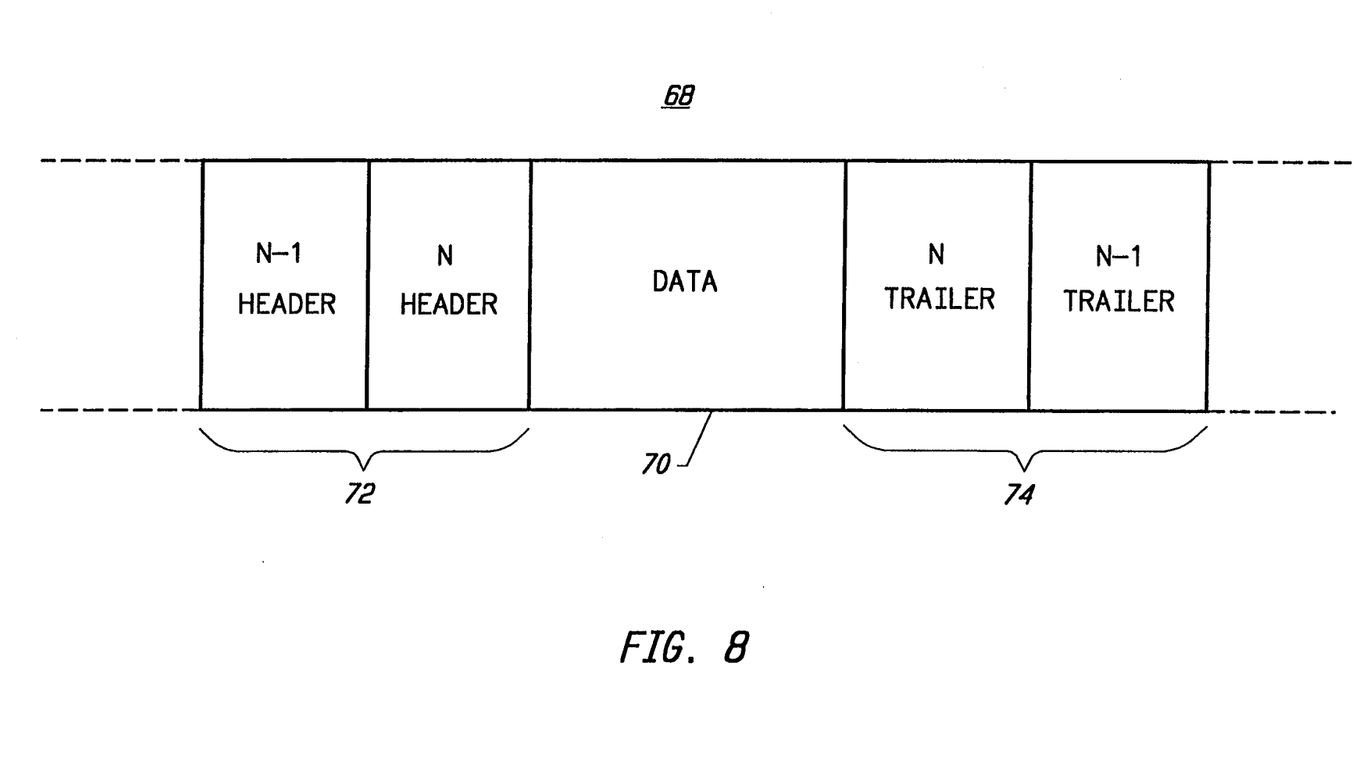
FIG. 8 is a schematic representation of the organization of a data packet sent through a network.

CNEDD 10 examines each IP data packet 68 flowing into or out of sub-network 46. As was mentioned above, each IP data packet consists of data characters 70, plus header characters 72 and trailer characters 74 inserted by the various network layers (see FIG. 8). Included in header characters 72 are information about the source and destination of IP data packet 68, checksums for data characters 70 and header characters 72, as well as options bits containing information about the data being transferred in data packet 68. For example, an option bit or bits in header characters 72 might indicate that data characters 70 are encrypted, or that data characters 70 are part of a file transfer.

Figure 7:
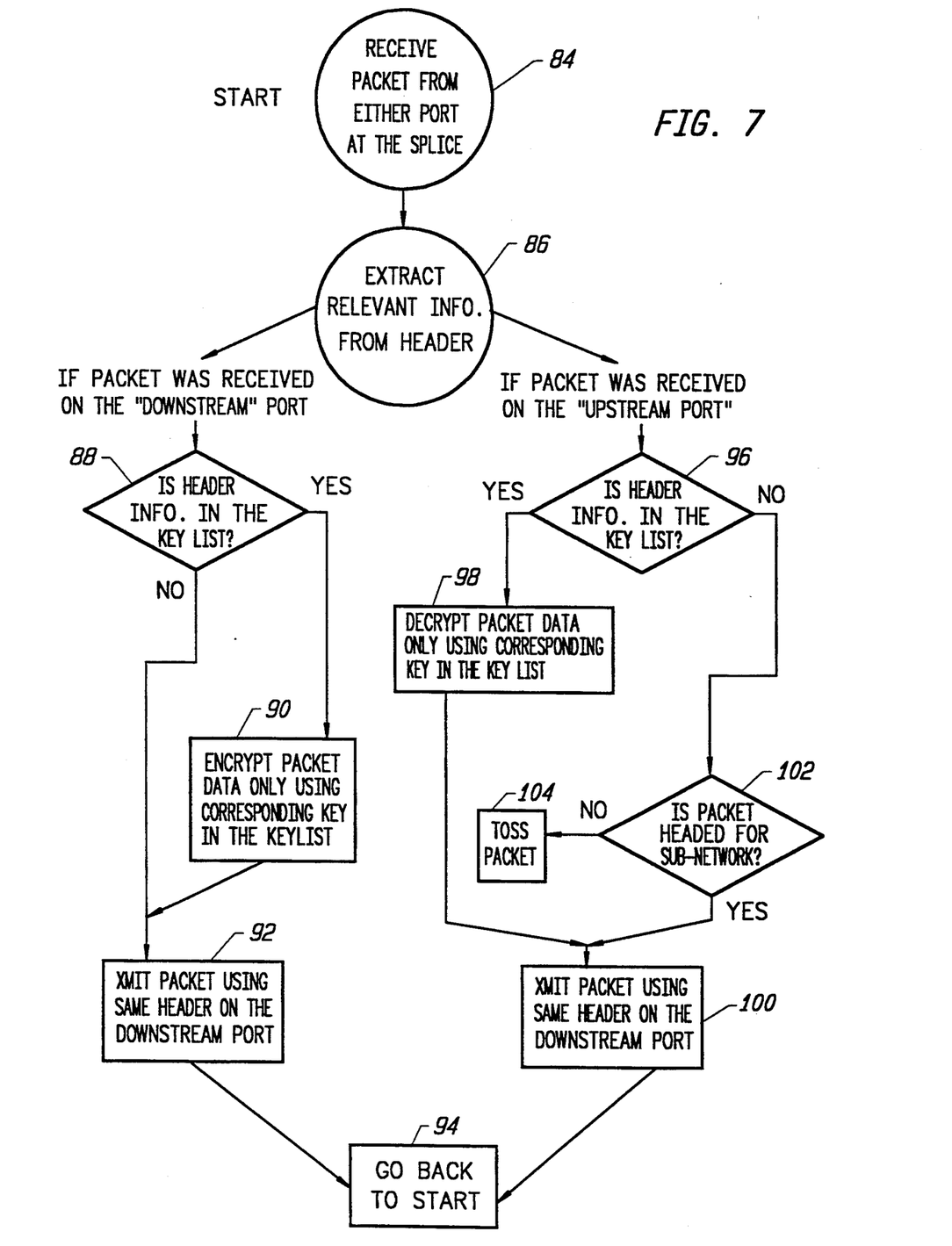
FIG. 7 is a flow chart showing the algorithm followed by the present invention.

Referring now to ;FIGS. 1, 4A, 4B and 7, CNEDD 10 operates to encrypt data by receiving an IP data packet 68 from downstream network port 14 (FIG. 7, step 84). CNEDD 10 then uses microprocessor 20, support peripherals 28, and main memory 24 to extract the destination information or other information in header 72 (step 86). The information extracted from header 72 is then temporarily stored in microprocessor 20 or main memory 24. CNEDD 10 then compares the information from header 72 with a table, or key list, stored (while CNEDD 10 is operating) in memory 24 (step 88).

There are typically three separate elements to the key list structure. The first element, the matching criteria, contains a list of source addresses, destination addresses, and other information that could be found in header characters 72.

The second element might contain a plurality of keys used to encrypt and decrypt data characters 70. Finally, the third element in the ;key list includes handling instructions for each data packet 68 passing through CNEDD 10. Depending on how information in header characters 72 matches the matching criteria, data 70 may be encrypted, decrypted, otherwise modified, passed through without modification, or data packet 68 may be tossed (deleted).

This key list is stored in non-volatile memory 26 when CNEDD 10 is not operating, and can be modified or replaced by the operator of CNEDD 10 through control terminal 44. In addition, the key list could be changed by access through another terminal on network 46, or through the use of public key access techniques.

There are several methods by which information in header characters 72 can be compared with information stored in the keylist. In a preferred embodiment, a series of masks can be used to compare significant portions of the header information with information in the key list. For example, it might be desired to encrypt all data packets sent to a particular sub-network. Because certain portions of the addresses of the terminals in that sub-network would be identical (the portion identifying the terminal as belonging to the sub-network), the other, more specific portions of the address could be masked, and thus not included in the comparison. This reduces the amount of data that must be compared to get a match (a "hit") on the keylist, and reduces the time needed to implement the appropriate handling instruction.

In addition to the mask described above, a series of other masks can be used. Handling instructions can be dependent upon which mask is used when a hit is recorded. For example, a second mask might mask out all bits in an address, which would always result in a hit on the keylist. The handling instruction associated with a hit obtained with the second mask might be to pass data through without encrypting or decrypting it.

If a comparison of the information extracted from header 72 the with the information stored in the key list indicates that the data should be encrypted, CNEDD 10 encrypts data 70 using encryption/decryption hardware 30 and a key stored in main memory 24 corresponding to the destination or other characteristics of IP data packet 68 (step 90).

After data 70 has been encrypted, IP data packet 68 is reconstructed. Header characters 72 will be modified to conform to the changes made in data characters 70. An option bit may be used to indicate that data characters 70 have been encrypted. New checksums for data characters 70 and header characters 72 must be computed and inserted in header characters 72. However, all routing information found in header characters 72 (indicating the source and destination of data packet 68) is unchanged. Changes may also need to be made to trailing characters in the package such as checksums. IP data packet 68, comprising modified header characters 72, encrypted data 70, and modified trailer characters 74 is then transmitted upstream to external network 56 via upstream network port 12 (step 92), and CNEDD 10 prepares to receive another packet (step 94).

If a comparison of the information stored in header 72 with the key list stored in main memory 24 indicates that the data should be passed through without modification, data 70 is not modified in any way and IP data packet 68 is then transmitted, unmodified, upstream to external network 56 via upstream network port 12 (step 92), and CNEDD 10 prepares to receive another packet (step 94).

CNEDD 10 operates to decrypt data by receiving a data packet 68 from upstream network port 12 (step 84). CNEDD 10 then uses microprocessor 20, support peripherals 28, and main memory 24 to extract source information or other information from header 72 (step 86). The information extracted from header 72 is then temporarily stored in microprocessor 20 or main memory 24. Next, CNEDD 10 compares the information extracted from header 72 with a table, or key list stored in main memory 24 (step 96).

If a comparison of the information extracted from header 72 the with the information stored in the key list indicates that the data should be decrypted, CNEDD 10 decrypts data 70 using encryption/decryption hardware 30 and a key stored in main memory 24 corresponding to the source or other characteristics of IP data packet 68 (step 98).

After data 70 has been decrypted, IP data packet 68 is reconstructed. Header characters 72 will be modified to conform to the changes made in data characters 70. New checksums for data characters 70 and header characters 72 must be computed and inserted in header characters 72. However, all routing information found in header characters 72 (indicating the source and destination of data packet 68) is unchanged. Changes may also need to be made to trailing characters in the packet such as checksums. IP data packet 68, comprising modified header characters 72, encrypted data 70, and modified trailer characters 74 is then transmitted upstream to network 46 via downstream network port 14 (step 100), and CNEDD 10 prepares to receive another packet (step 94).

If a comparison of the information stored in header 72 with the key list stored in main memory 24 indicates that the data should be passed through without modification, data 70 is not decrypted and IP data packet 68 is then transmitted, unmodified, downstream to network 46 via downstream network port 12 (step 100), and CNEDD 10 prepares to receive another packet (step 94).

If a comparison of the destination information stored in header 72 width the key list stored in main memory 24 indicates that the data should be tossed (step 102), as may occur if data packet 68 is not destined for any node in network 46, data packet 68 is not transmitted to downstream port 14 (step 104).

Figure 4B:
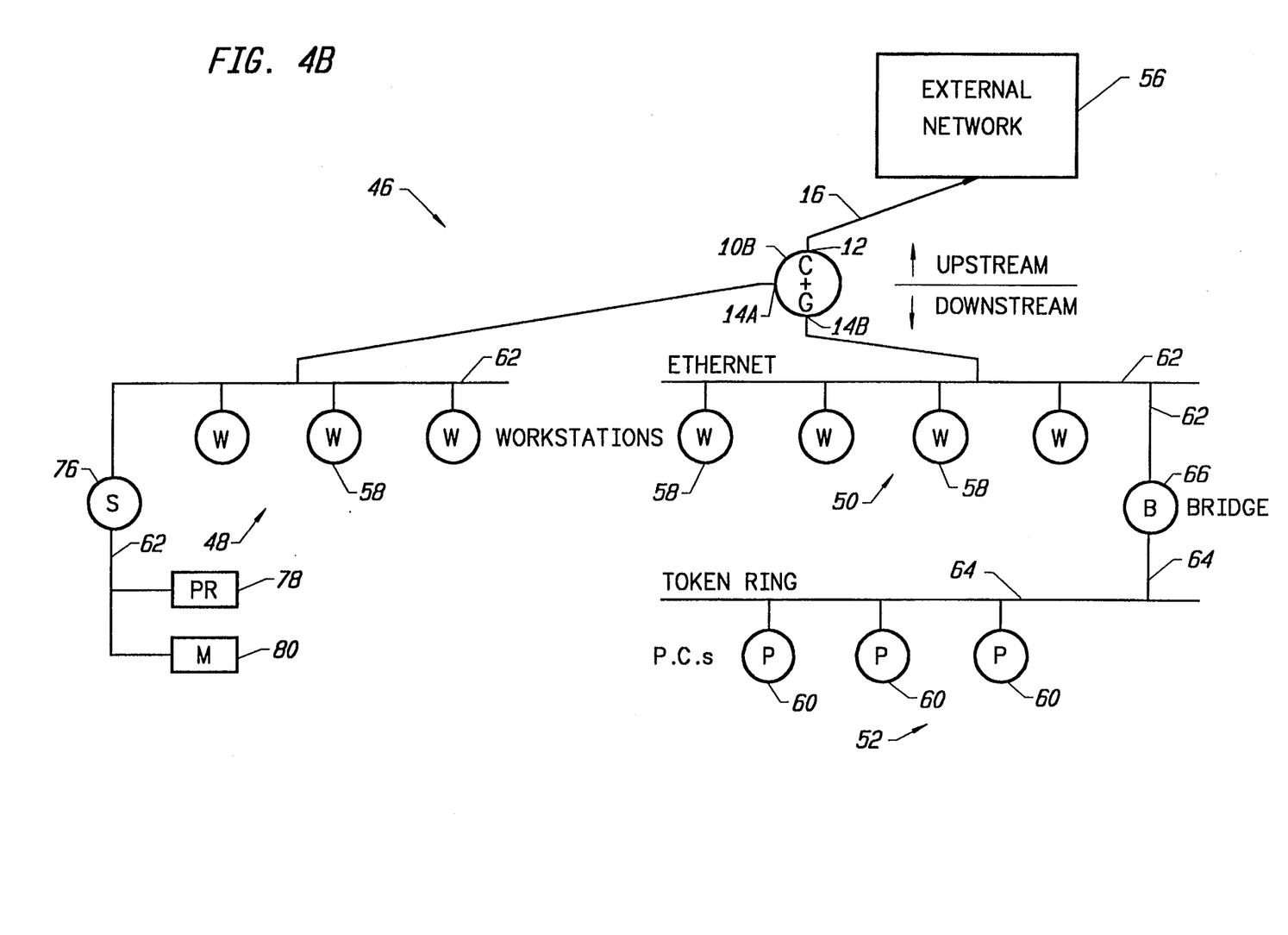
FIG. 4B is a block diagram showing a placement of the present invention in the networks of FIG. 3 wherein the functions of the invention and a gateway are combined in a single unit.

FIG. 4B shows the sub-networks of FIG. 3 with the addition of combined gateway and CNEDD 10B spliced into the data stream between network 46 and external network 56. Combined gateway and CNEDD 10B has a single upstream data port 12, and can have multiple downstream data ports. FIG. 4B shows two downstream data ports, 14A and 14B.

Operation of combined gateway and CNEDD 10B is identical to that described above with respect to separate gateway 54 and CNEDD 10. However, combined gateway and CNEDD 10B offers distinct advantages over the separate components. For example, combining the functionality of a CNEDD and a gateway in a single device would be less expensive than having separate devices perform the same functions. In addition, combined gateway and CNEDD 10B offers a performance advantage by causing less delay in communications with other networks because data packets need only be received and retransmitted once instead of twice.

Figure 5A:
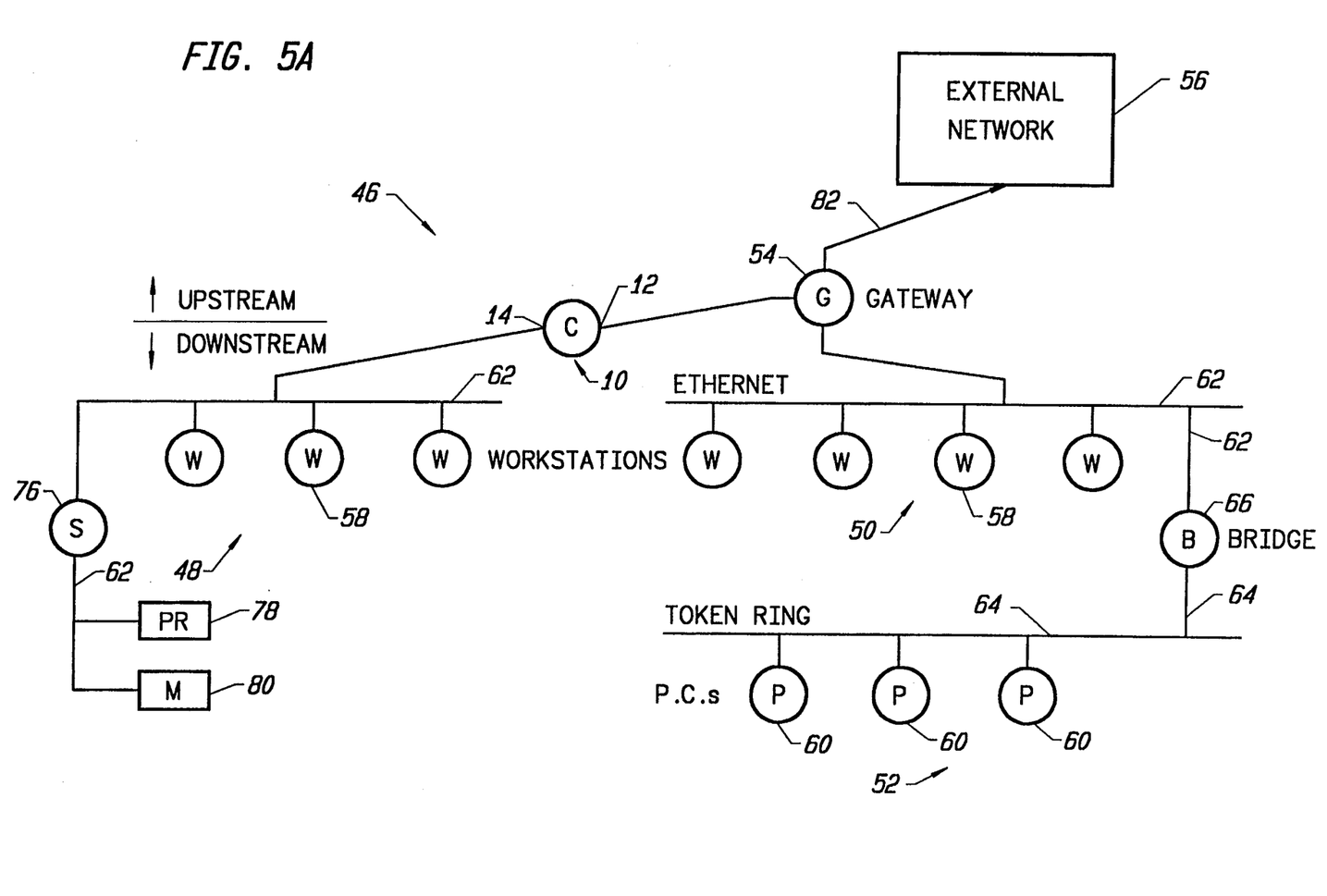
FIG. 5A is a block diagram showing an alternative placement of the present invention in the networks of FIG. 3.

FIG. 5A shows the sub-networks 46 of FIG. 3 with the addition of CNEDD 10 spliced into the serial data stream between sub-network 48 and gateway 54. This provides sub-network 48 with the same encryption/decryption services described above with respect to FIG. 4A, without affecting the rest of network 46.

Figure 5B:
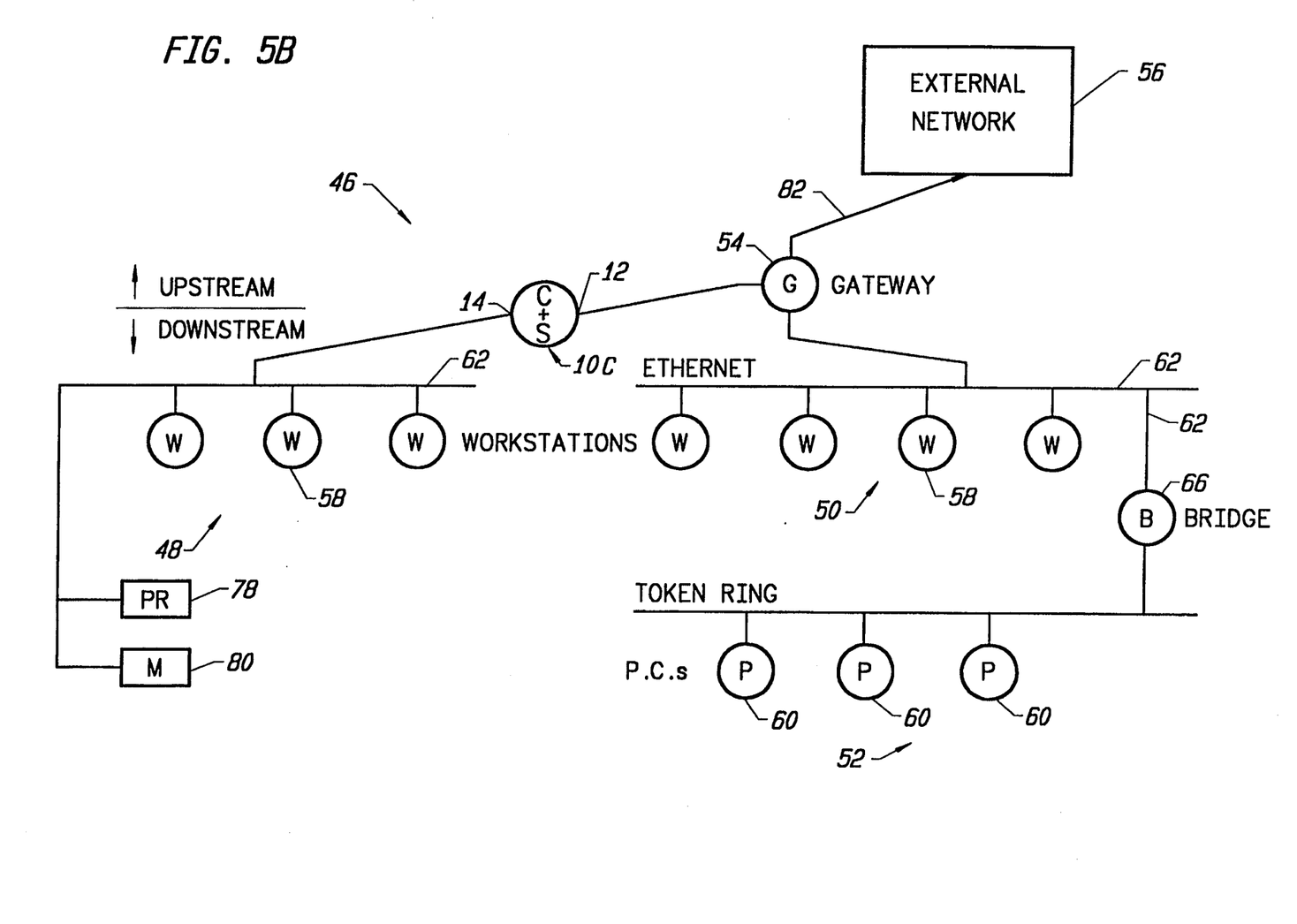
FIG. 5B is a block diagram showing an alternative placement of the present invention in the networks of FIG. 3 wherein the functions of the invention and a sub-network service computer are combined in a single unit.

FIG. 5B shows the sub-networks 46 of FIG. 3 with the addition of combined service computer and CNEDD 10C spliced into the serial data stream between sub-network 48 and gateway 54. This provides sub-network 48 with the same encryption/decryption services described above with respect to FIG. 5A, without affecting the rest of network 46.

Combined service computer and CNEDD 10C combines the functions of CNEDD 10 with one or more of the functions provided by sub-network service computer 76, such as file serving, printer spooling, remote system backup, and modem serving. Combined service computer and CNEDD 10C allows secure transmission of files from remote locations to printer 78 or modem 80. While combined service computer and CNEDD 10C provides the same functionality as service computer 76 and CNEDD 10 (see FIG. 5A), there is an economic advantage to combining the functions in one device when increasing the capacity of an existing sub-network or installing a new sub-network.

Figure 6:
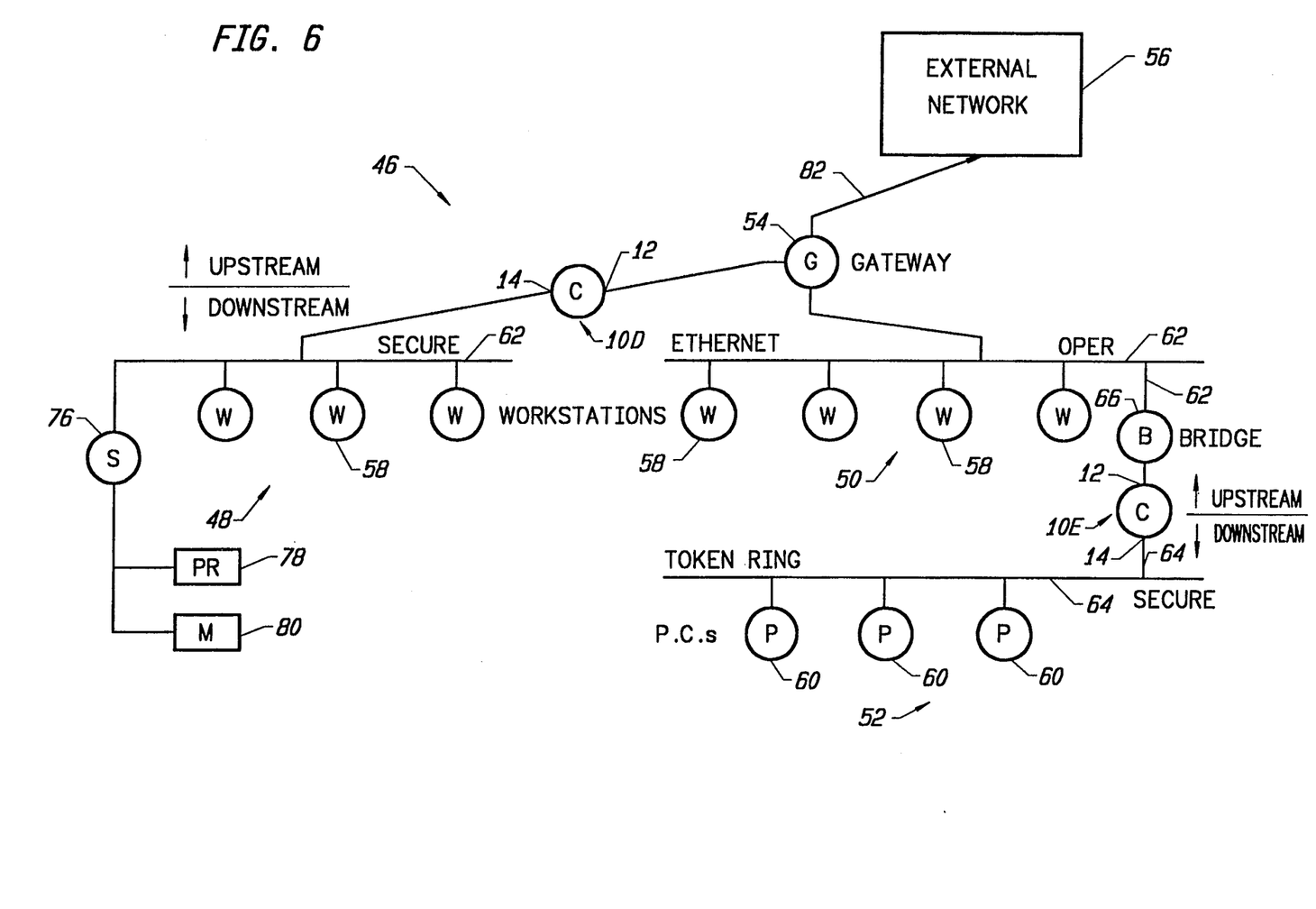
FIG. 6 is a block diagram showing other alternative placements of the present invention in the networks of FIG. 3.

FIG. 6 shows the sub-networks 46 of FIG. 3 with the addition of two CNEDDs 10D and 10E. CNEDD 10D is spliced into the serial data stream between sub-network 48 and gateway 54, in a manner identical to that described in FIG. 5A. CNEDD 10E is spliced into the network transmission medium between sub-network 52 and bridge 66. This configuration allows for secure communications between sub-networks 52 and 48, as well as to external network 56. This might be useful where it is not possible to physically confine the network transmission medium between sub-networks 52 and 48, or where users of sub-network 50 are not given access to confidential information in sub-networks 52 and 48.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments, and with various modifications as are suited to the particular use contemplated. It is intended that the scope of the invention be defined only by the appended claims.

What is claimed is:

1. An apparatus for selectively encrypting and decrypting data transmitted between a first computer network and a second computer network, wherein said data is included in multiple data fields contained in multiple packets, each of said packets includes a header field containing source and destination information, said apparatus comprising:
   memory means for storing key list information;
   means, coupled to said memory means, for determining selected ones of said data fields for encryption and for determining said selected ones of said data fields for decryption;
   data encryption means for selectively encrypting said selected ones of said data fields, and
   data decryption means for selectively decrypting said selected ones of said data fields.

2. The apparatus of claim 1, wherein said first network and said second network operate with respective predetermined protocols, said apparatus further including gateway means for translating said protocols between said first network and said second network.

3. The apparatus of claim 1 wherein said first network includes a printer, said apparatus further including printer spooling means for spooling files to said printer included in said first network.

4. The apparatus of claim 1 wherein said first network includes a plurality of users, said apparatus further including file serving means for storing and transmitting files that are shared by said users.

5. The apparatus of claim 1 further including remote system backup means for backing up said files in use on said first network.

6. The apparatus of claim 1 wherein said first network includes a modem, said apparatus further including modem serving means for controlling the transmission of said packets over said modem.

7. The apparatus of claim 1 wherein said means for determining is a microprocessor.

8. The apparatus of claim 1 wherein said memory means also includes means for storing masking information, and said means for determining includes means for masking said source information and said destination information.

9. In an apparatus for selectively encrypting multiple data fields contained in multiple packets contained in multiple packets of said packets each transmitted from a first computer network to a second computer network, wherein said each of said packets includes a header field containing destination information and at least one of said data fields containing data, said apparatus including microprocessor means, first network connection means for receiving said packets from said first network, second network connection means for transmitting said packets to said second network, data encryption means for selectively encrypting said data fields, and memory means for storing key list information, wherein said key list information includes a list of destinations to which data fields are encrypted;
   a method of operating said apparatus to selectively encrypt said data fields of said packets transmitted from said first network to said second network, said method comprising the steps of:
      receiving said packets from said first network connection means;
      extracting said destination information from said header field of each of said packets;
      comparing said destination information with said list of destinations to determine selected ones of said data fields of said packets for encryption; and
      encrypting said data fields of said packets.

10. The method of claim 9 further including the step of: transmitting new packets to said second network via said second network connection means if said data fields of said packets have been encrypted, said new packets comprising said header field and said encrypted data fields of said packets.

11. The method of claim 9 further including the step of: transmitting the original packets to said second network via said second network connection means if said data fields of said packets have not been encrypted, said original packets comprising said header fields and said data fields of said packets.

12. In an apparatus for selectively decrypting multiple data fields contained in multiple packets, each of said packets transmitted from a second computer network to a first computer network, wherein each of said packets includes a header field containing source information and at least one of said data fields containing data, said apparatus including microprocessor means, first network connection means for transmitting said packets to said first network, second network connection means for receiving said packets from said second network, data decryption means for selectively decrypting said data fields, and memory means for storing key list information, wherein said key list information includes a list of sources from which data fields are decrypted;
   a method of operating said apparatus to selectively decrypt said data fields of said packets transmitted from said second network to said first network, said method comprising the steps of:
      receiving said packets from said second network connection means;
      extracting said source information from said header field of each of said packets;

comparing said source information with said list of sources to determine selected one of said data fields of said packets for decryption; and decrypting said selected ones of data fields of said packets.

13. The method of claim 12 further including the step of: transmitting a new packet to said first network via said first network connection means if said data field of said packet has been decrypted, said new packet comprising said header field and said decrypted data field of said packet.

14. The method of claim 12 further including the step of: transmitting the original packet to said first network via said first network connection means if said data field of said packet has not been decrypted, said original packet comprising said header field and said data field of said packet.

15. An apparatus for selectively encrypting multiple data fields contained in multiple packets each of said packets transmitted from a first computer network to a second computer network, wherein each of said packets includes a header field containing destination information and at least one of said data fields containing data, said apparatus comprising:

means for receiving said packets from said first network;

means for extracting said destination information from each of said header fields of each of said packets;

memory means for storing a list of destinations to which said data fields are encrypted;

means for comparing said destination information extracted from said header field of each of said packets with said list of destinations to determine selected ones of said data fields of said packets for encryption; and means for encrypting said selected data fields of said packets.

16. The apparatus of claim 15 further including means for transmitting a new packet to said second network if said data field of said packet has been encrypted, said new packet comprising said header and said encrypted data field of said packet.

17. The apparatus of claim 15 further including means for transmitting the original packet to said second network if said data field of said packet has not been encrypted, said original packet comprising said header and said data field of said packet.

18. The apparatus of claim 15 wherein said memory means also includes means for storing masking information, and said means for comparing includes means for masking said destination information.

* * * * *